(12) United States Patent
Reis et al.

(10) Patent No.: US 6,435,242 B1
(45) Date of Patent: *Aug. 20, 2002

(54) REPAIR PRESSURE APPLICATOR

(76) Inventors: Carl Andrew Reis, 18005 Atkinson Ave., Torrance, CA (US) 90504; Thomas James Ambrose, 3720 Floresta Way, Los Angeles, CA (US) 90043

( * ) Notice: Subject to any disclaimer, the term of this patent is extended or adjusted under 35 U.S.C. 154(b) by 115 days.

This patent is subject to a terminal disclaimer.

(21) Appl. No.: 09/624,456

(22) Filed: Jul. 24, 2000

Related U.S. Application Data

(60) Continuation-in-part of application No. 09/394,793, filed on Sep. 13, 1999, now Pat. No. 6,318,433, which is a division of application No. 09/046,484, filed on Mar. 23, 1998, now Pat. No. 5,975,183.

(51) Int. Cl.[7] ............................................... B32B 35/00
(52) U.S. Cl. .......................... 156/382; 156/94; 156/580
(58) Field of Search ............................ 156/94, 98, 381, 156/382, 580, 285; 244/133; 425/12, 14; 269/21, 22, 287

(56) References Cited

U.S. PATENT DOCUMENTS

| | | | | |
|---|---|---|---|---|
| 3,207,503 A | | 9/1965 | Clover, Jr. et al. | ........... 269/21 |
| 3,661,683 A | | 5/1972 | Engel et al. | ................ 156/580 |
| 3,770,259 A | | 11/1973 | Wagreich | ..................... 269/21 |
| 3,833,230 A | | 9/1974 | Noll | .............................. 279/3 |
| 3,837,965 A | | 9/1974 | Mahon | ........................ 156/94 |
| 3,910,620 A | | 10/1975 | Sperry | ......................... 294/64 |
| 4,554,036 A | * | 11/1985 | Newsom | ..................... 156/94 |
| 5,047,668 A | | 9/1991 | Bosenberg | ................... 359/330 |
| 5,374,388 A | | 12/1994 | Frailey | ........................ 264/510 |
| 5,400,173 A | | 3/1995 | Komine | ...................... 259/330 |
| 5,442,156 A | | 8/1995 | Westerman et al. | ......... 219/243 |
| 5,492,466 A | | 2/1996 | Frailey | ........................ 425/389 |
| 5,728,258 A | | 3/1998 | Chung | ........................ 156/580 |
| 5,975,183 A | * | 11/1999 | Reis et al. | .................. 156/580 |
| 6,318,433 B1 | * | 11/2001 | Reis et al. | .................. 156/382 |

FOREIGN PATENT DOCUMENTS

GB            2252840         8/1992

* cited by examiner

*Primary Examiner*—Michael W. Ball
*Assistant Examiner*—Gladys Piazza
(74) *Attorney, Agent, or Firm*—Stetina Brunda Garred & Brucker

(57) ABSTRACT

In accordance with the present invention, there is provided a pressure applicator device for applying pressure to a repair patch of a repair surface. The pressure applicator device is provided with a generally annular suction member for providing suction attachment to the repair composite surface about the repair patch. The pressure applicator device is further provided with a cover member which is disposable above and across the suction member. The cover member is attached to the suction member. The pressure applicator device is further provided with a flexible pressure bladder formed of a generally fluid tight elastic material which is disposed beneath the cover member and interior to the suction member. The pressure bladder defines upper and lower chambers. The upper chamber is disposed between the cover member and the pressure bladder. The lower chamber is disposable between the pressure bladder and the repair surface. The pressure bladder is sized and configured to apply pressure to the repair patch upon fluid evacuation of the lower chamber.

20 Claims, 3 Drawing Sheets

REPAIR PRESSURE APPLICATOR

CROSS-REFERENCED TO RELATED APPLICATIONS

The present application is a continuation-in-part of U.S. application Ser. No. 09/394,793 entitled REPAIR PRESSURE APPLICATOR FOR IN THE FIELD DAMAGED AIRCRAFT filed on Sep. 13, 1999, now U.S. Pat. No. 6,318,433, which is a divisional application of Ser. No. 09/046,484 filed on Mar. 23, 1998, now U.S. Pat. No. 5,975,183 entitled REPAIR PRESSURE APPLICATOR FOR IN THE FIELD DAMAGED AIRCRAFT issued on Nov. 2, 1999, the disclosures of which are incorporated herein by reference.

STATEMENT RE: FEDERALLY SPONSORED RESEARCH/DEVELOPMENT (Not Applicable)

BACKGROUND OF THE INVENTION

The present invention relates generally to repair pressure applicators, and more particularly to a repair pressure applicator having an inflatable bladder for applying pressure against a repair patch.

Typically the surface repair process includes filling a damaged surface region with an adhesive or other filler material so as to bring the surface of the damaged area flush with that of the adjacent undamaged surface areas. A repair patch is formed to substantially conform to the contour. The repair patch formed so as to overlap onto the adjacent undamaged surface area to obtain a metal-to metal (or composite-to-composite, as the case may be) bond region adequate to hold the repair patch in place. The repair patch is then adhesively bonded to the damaged area with a curing adhesive. The term adhesive is contemplated to include, but not limited to, epoxy resin, glue, cement and other bonding agents. Commonly, the adhesive requires heat to be applied to properly cure the adhesive or to accelerate the curing process.

In addition, trapped air is commonly encountered in the bondline between the structure and the repair patch. This may take the form of small bubbles and volatiles which produce porosity in the bondline. This process which occurs during curing and/or heating processes is sometimes described as volatile evolution or gas migration. During the curing process, however, these small bubbles may grow to become large bubbles or voids which significantly reduce the quality of the adhesive bond. It is known in the art that the application of uniform pressure to the repair patch during the curing process tends to squeeze out the trapped air in the bondline or otherwise mitigate the growth of the air bubbles into larger ones. Thus, the quality of adhesive bonding depends largely upon the application of substantially uniform pressure over the repair patch during the adhesive curing process.

A conventional method of applying pressure to the repair patch on-aircraft repair involves using a flexible vacuum bag or cover. The vacuum bag is positioned over the repair patch and sealed around the perimeter. A vacuum or negative pressure source is applied to the vacuum bag so as to evacuate the vacuum bag, thereby collapsing the vacuum bag and forcing the vacuum bag against the repair patch. The amount of pressure applied to the repair patch is limited by the amount of vacuum pressure which may be achieved. For example, where there are holes or otherwise porous surfaces within the vacuum bagged area, such holes must be sealed prior to achieving adequate vacuum pressure. In addition, the sealing of the perimeter of the vacuum bag may present problems, especially where significant vacuum pressures are required to achieve a corresponding desired repair patch pressure.

Another method of applying pressure to a repair patch involves using tooling constructed specifically for a given repair. Obviously, such repair specific tooling is costly, labor intensive and inefficient.

Where the adhesive is a heat-curing adhesive, a heat source is additionally applied to the repair patch in conjunction with a pressure applicator. A conventional method for applying heat is through the use of a heating blanket.

Furthermore, surfaces in need of repair, such as those of aircraft, often are not located on smooth, flat, upward-facing areas. As such, repairs typically need to be effectuated surfaces which may be vertical or even downward facing. In addition, where the repair surface is located at an area which is contoured, the repair patch may be oriented significantly different from those surfaces immediately adjacent to the repair patch. For example, the convex curvature at the leading edge of an aircraft wing and the concave curvature where the wings intersect aircraft fuselage present potential repair areas where the aircraft surface at the repair patch is significantly different from adjacent surface areas. Conventional pressure applicator devices may not be readily deployable at such contoured regions.

It is therefore evident that there exists a need in the art for a pressure applicator device for applying pressure to a repair patch during the curing process which facilitates repairs, applies substantially uniform pressure to the repair patch, accommodates the use of a heat source, such as a heating blanket, and is deployable adjacent a variable contoured surface.

BRIEF SUMMARY OF THE INVENTION

In accordance with the present invention, there is provided a pressure applicator device for applying pressure to a repair patch of a surface. The pressure applicator device is provided with a suction member for providing suction attachment to the surface about the repair patch. The pressure applicator device is further provided with a cover member which is disposable above and across the suction member. The cover member is attached to the suction member. The pressure applicator device is further provided with a flexible pressure bladder formed of a generally fluid tight elastic material which is disposed beneath the cover member and interior to the suction member. The pressure bladder defines upper and lower chambers. The upper chamber is disposed between the cover member and the pressure bladder. The lower chamber is disposable between the pressure bladder and the surface. The pressure bladder is sized and configured to apply pressure to the repair patch upon fluid evacuation of the lower chamber. In addition, the pressure bladder may be sized and configured to extend towards the cover member upon fluid evacuation of the upper chamber.

It is contemplated that the fluid conditions within the upper and lower chambers may be selectively controlled. In this regard, in the preferred embodiment of the present invention, the pressure applicator device is further provided with an lower port in fluid communication with the lower chamber for selectively controlling pressure within the lower chamber. The lower port is ventable to ambient fluid conditions external to the pressure applicator device.

Further, the lower port is attachable to a vacuum source for fluid evacuation of the lower chamber, and attachable to a pressure source for fluid increasing the fluid pressure within the lower chamber. Similarly, the pressure applicator device is further provided with an upper port in fluid communication with the upper chamber for selectively controlling pressure within the upper chamber. The upper port is ventable to ambient fluid conditions external to the pressure applicator device. Further, the upper port is attachable to a vacuum source for fluid evacuation of the upper chamber, and attachable to a pressure source for fluid increasing the fluid pressure within the upper chamber.

In the preferred embodiment of the present invention, the suction member is generally annular and a generally annular gasket is disposed between the pressure bladder and the suction member. Lower port is integrally formed with the gasket and extends radially inward towards the lower chamber through the gasket.

Further, the suction device may be provided with a generally annular outer seal disposable around the repair patch, and a generally annular inner seal disposable radially interior to the outer seal and around the repair patch. The outer seal and the inner seal are configured to form a vacuum seal within the annular region therebetween. In this regard, the suction device facilitates a significant attachment area for allowing secure attachment of the pressure applicator device. In addition, a heat source may be disposed adjacent the pressure bladder for transferring heat to the repair patch upon application of pressure to the repair patch by the pressure bladder. In this regard, the heat source may take the form of a heat blanket which may be integrated with the pressure bladder.

The present invention overcomes limitations associated with prior art pressure applicator devices. The limitations encountered with the vacuum bag method of applying pressure are mitigated in that the pressure applied to the repair patch is not limited by the vacuum bag seal achieved. In fact, the pressure applicator of the present invention may be deployable on top of a vacuum bag arrangement for applying additional pressure beyond that applied by the vacuum bag. Advantageously, the present invention facilitates the selective application of pressure by the pressure bladder to the repair patch. Further, the environment within the upper and lower chambers are controllable. In this regard, the lower chamber may be subject to a vacuum draw. Such lower chamber vacuum draw may be effectuated without the application of downward pressure on the repair patch, as the upper chamber may be evacuated for maintaining the pressure bladder in an upward position away from the repair patch. It is contemplated that such lower chamber vacuum draw encourages the release of volatiles from the repair patch and facilitates the removal of such volatiles. Subsequently, the vacuum draw within the upper chamber may be removed and vented to atmospheric pressure. In this regard, the pressure bladder is contemplated to apply a positive atmospheric pressure to the repair patch. Should further pressure be desired, the pressure within the upper chamber may be increased and thereby increasing the pressure exerted by the pressure bladder to the repair patch. Further, as mentioned above, the pressure bladder may be utilized with the addition of a heat source. As such, it is contemplated that the present invention facilitates a broad range of curing processes which include the combinations of applications of pressure, temperature and volatile venting previously not available by a single tool or device.

BRIEF DESCRIPTION OF THE SEVERAL VIEWS OF THE DRAWING

These, as well as other features of the present invention, will become more apparent upon reference to the drawings wherein.

DETAILED DESCRIPTION OF THE INVENTION

Figure 1:
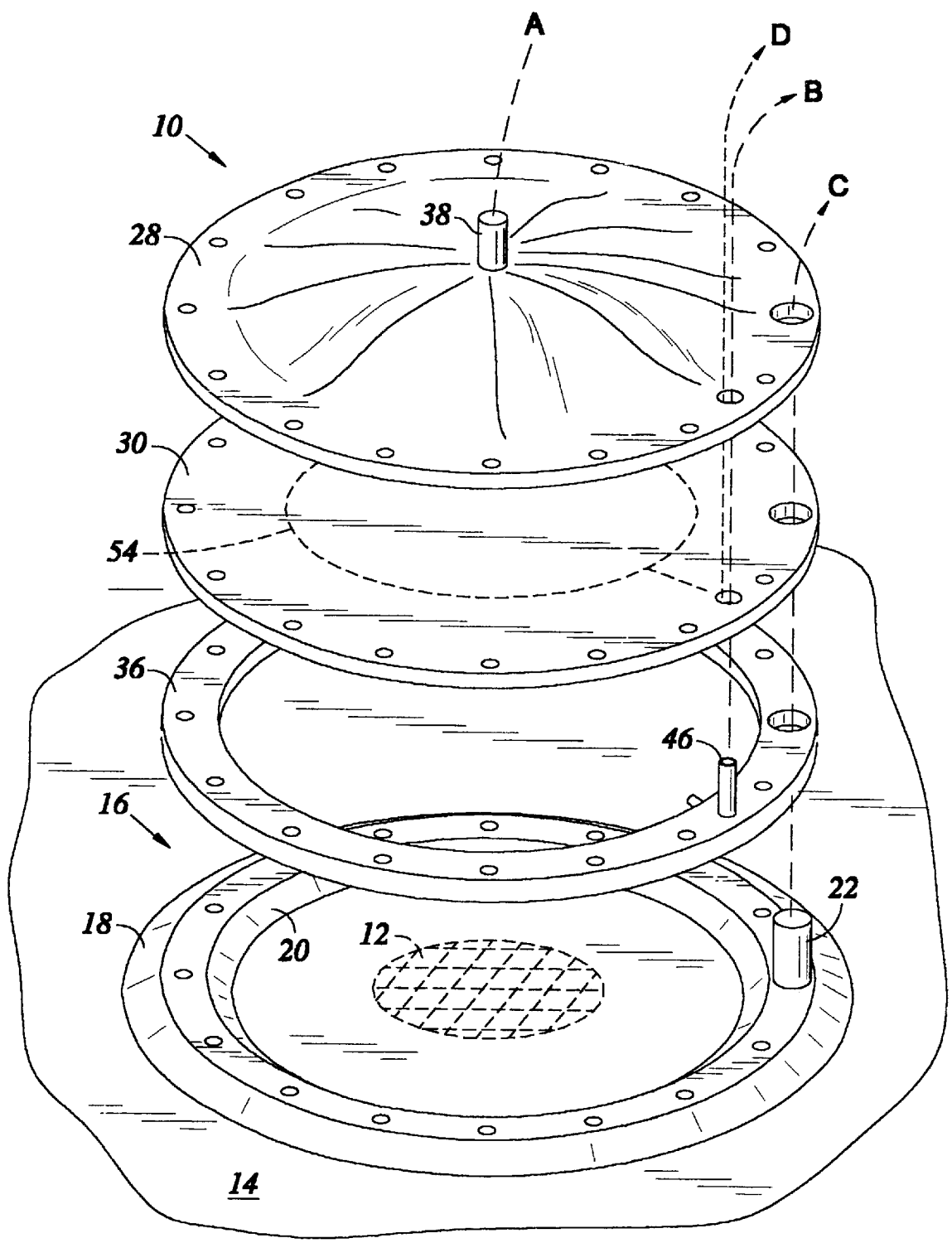
FIG. 1 is an exploded perspective view of the pressure applicator device of the present invention.

Referring now to the drawings wherein the showings are for purposes of illustrating a preferred embodiment of the present invention only, and not for purposes of limiting the same, FIGS. 1, 2a–c and 3 illustrate a pressure applicator device which is constructed in accordance with the present invention.

In accordance with a preferred embodiment of the present invention, there is provided a pressure applicator device 10 for applying pressure to a repair patch 12 of a surface 14. Such surface 14 may, for example, be associated with an aircraft and may be formed of any number of materials, such as composites and metals. The pressure applicator device 10 is preferably provided with a generally annular suction member 16 for providing suction attachment to the aircraft surface 14. In the preferred embodiment of the present invention, the suction member 16 is provided with a generally annular outer seal 18 disposable around the repair patch 12. The suction member 16 is further provided with a generally annular inner seal 20 which is disposable radially interior to the outer seal 18 and around the repair patch 12. Thus, the outer seal 18 and the inner seal 20 are formed to define an annular region therebetween and cooperatively form a vacuum seal thereat. With regard to the generally shape of the suction member 16, it is contemplated that sharp angulations are desired to be avoided which may give rise to a susceptibility to pressure leakage thereat between the suction member 16 and the surface 14. In this regard, the suction member 16 need only be required to be sized and generally shaped to surround the repair patch 12. As such, an annular shape is preferred. In this regard, the suction member 16 may be shaped to be circular, as depicted. Other configurations are suitable, provided adequate measures are taken to facilitate a vacuum seal between the suction member 16 and the surface 14.

The suction member 16 may be provided with a suction port 22 for facilitating the application of a vacuum draw within the region formed by the suction member 16 and the surface 14. In this regard, the suction port 22 is symbolically depicted to be in fluid communication with a vacuum source 24, as shown in the symbolic diagram of FIG. 3. The vacuum draw applied to the suction port 22 may be selectively controlled via a valve 26.

The pressure applicator device 10 is further provided with a cover member 28 which is disposable above and across the suction member 16. The cover member 28 is configured to be sealably attached to the suction member 16. In this regard, the cover member 28 is generally sized and configured in relation to the shape of the suction member 16. The cover member 28 may be formed of a variety of materials which may be chosen from those well known to one of ordinary skill in the art. In the preferred embodiment, the cover member 28 is formed of an one inch thick molded rubber material with an imbedded wire mesh to provide strength. The cover member 28 is preferably cupped for enhanced structural strength.

The pressure applicator device 10 is further provided with a flexible pressure bladder 30 formed of a generally fluid tight elastic material. The pressure bladder 30 may be formed of a variety of materials which may be chosen from those well known to one of ordinary skill in the art, such as a rubber material for example. The pressure bladder 30 is disposed beneath the cover member 28 and interior to the suction member 16. In this regard, the pressure bladder 30 defines upper and lower chambers 32, 34 (as best depicted in the cross-sectional view of the pressure applicator device 10 of FIG. 2a). The upper chamber 32 is disposed between the cover member 28 and the pressure bladder 30. The lower chamber 34 is disposable between the pressure bladder 30 and the surface 14. In this regard, as is depicted, the respective peripheries of the cover member 28 and the pressure bladder 30 are sealably attached to the suction member 16. In the preferred embodiment, as will be discussed in further detail below, a gasket 36 is disposed between the pressure bladder 30 and the suction member 16 to facilitate such sealed attachment of suction member 16 and the pressure bladder 30.

It is further contemplated that while the inner seal 20, the outer seal 18, and the gasket 36 are depicted in the figures as separate components, it is contemplated that such components may be formed as combined components. Thus, it is contemplated that the gasket 36 may be formed as a unitary member with inner seal 20.

Figure 2A:
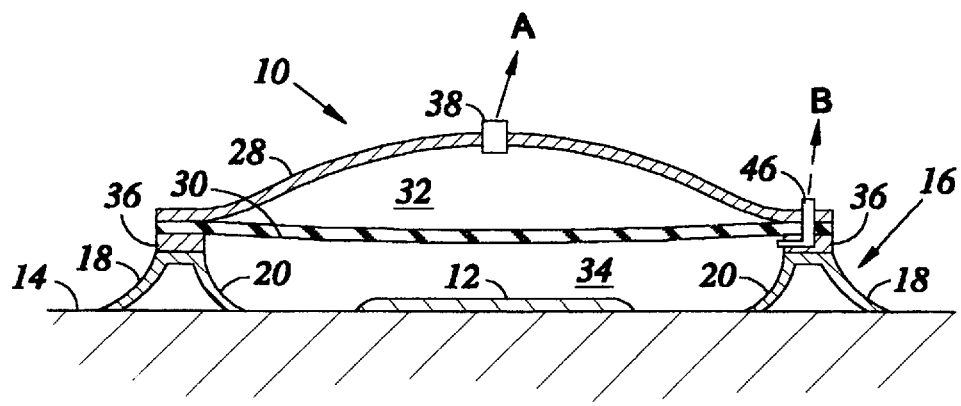
FIG. 2a is a cross-sectional view of the pressure applicator device of the present invention as shown with the pressure bladder in a neutral position.
Figure 2B:
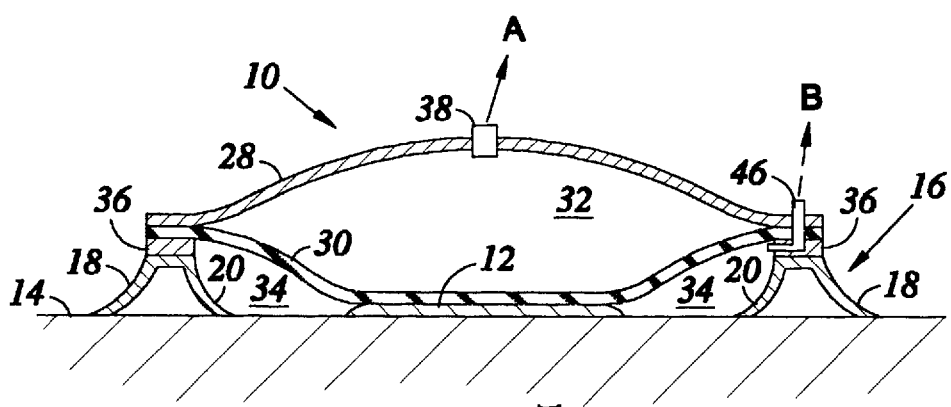
FIG. 2b is a cross-sectional view of the pressure applicator device of the present invention as shown with the pressure bladder expanded downward against a repair patch.
Figure 2C:
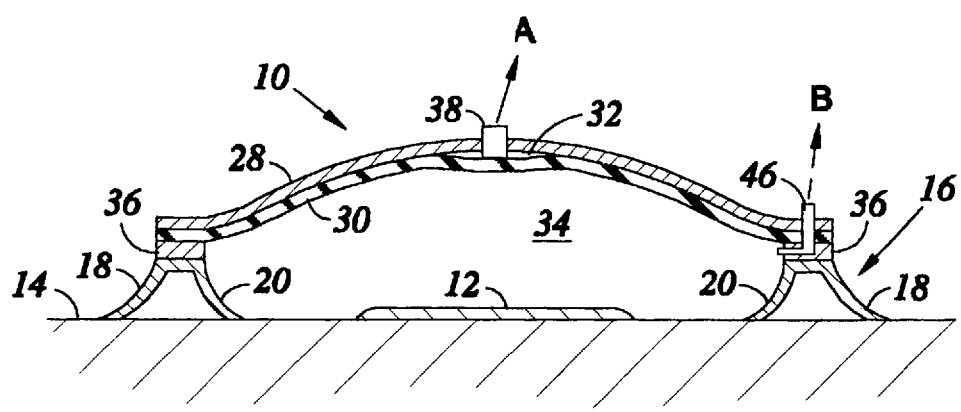
FIG. 2c is a cross-sectional view of the pressure applicator device of the present invention as shown with the pressure bladder expanded upward.
Figure 3:
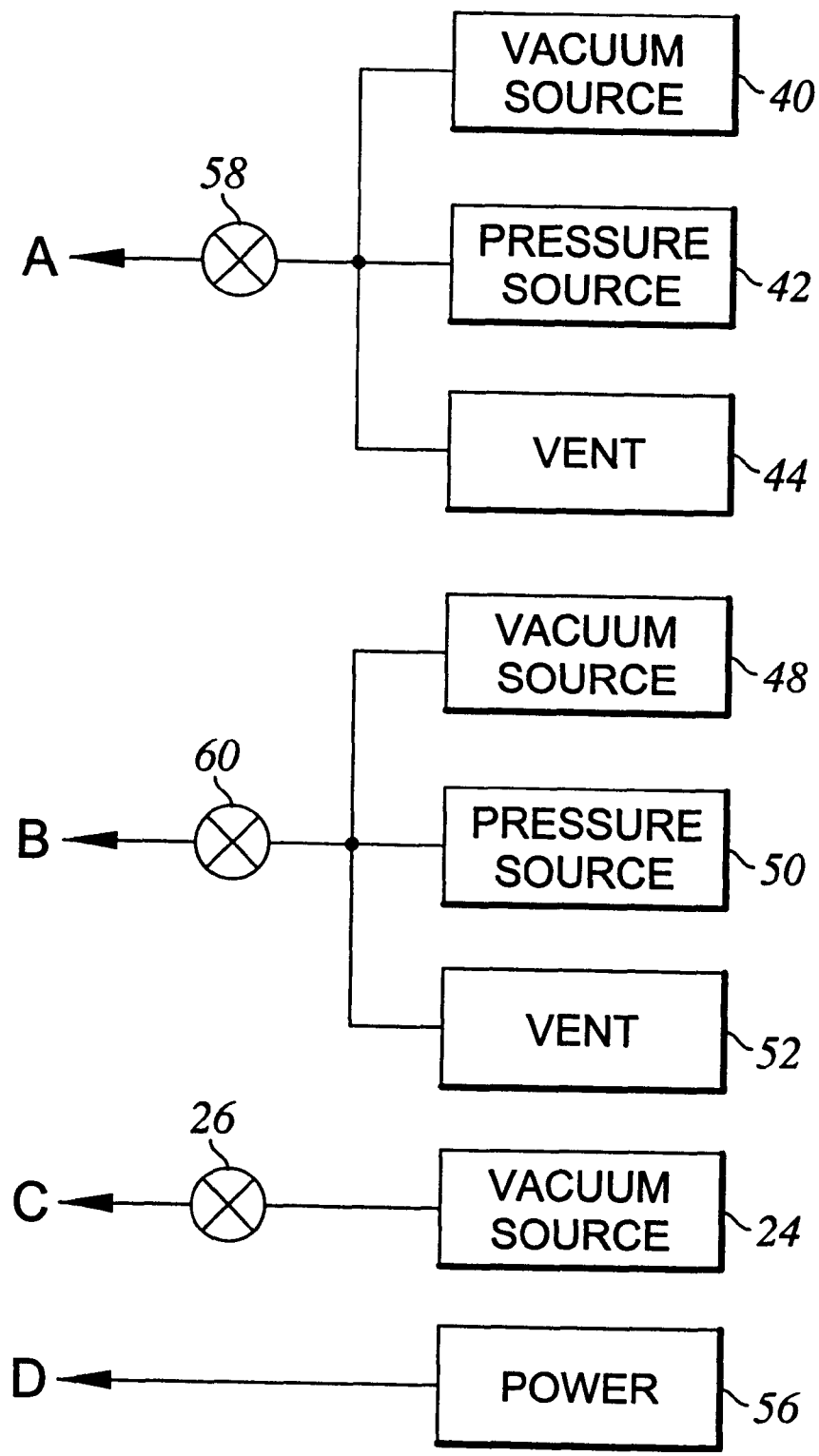
FIG. 3 is a symbolic diagram of the fluid and heat communication flows in connection with the pressure application device of the present invention.

Importantly, the pressure bladder 30 is sized and configured to apply pressure to the repair patch 12 upon fluid evacuation of the lower chamber 34. It is contemplated that relative sizing of the upper and lower chambers 32, 34 are directly impacted by the flexure of the pressure bladder 30. In this regard, in FIG. 2a, the pressure bladder 30 is depicted in a relatively neutral position. In FIG. 2b, the pressure bladder 30 is depicted in a downward position with the upper chamber 32 correspondingly enlarged. In FIG. 2c, the pressure bladder 30 is depicted in an upward position with the lower chamber correspondingly enlarged. As such, the pressure bladder 30 is configured to flex in a diaphragm-like manner.

It is contemplated that the fluid environment within the upper and lower chambers 32, 34 may be selectively controlled. In this regard, in the preferred embodiment of the present invention, an upper port 38 is disposed in fluid communication with the upper chamber 32 for selectively controlling pressure within and fluid flow to and from the upper chamber 32. In this regard, the upper port 38 may be disposed in fluid communication with a vent 44, as symbolically depicted in FIG. 3. As further symbolically depicted in FIG. 3, the upper port 38 is attachable to a vacuum source 40 for fluid evacuation of the upper chamber 32. In addition, the upper port 38 is attachable to a pressure source 42 for fluid increasing the fluid pressure within the upper chamber 32. It is contemplated that the vacuum source 40, the pressure source 42 and the vent 44 may comprise the same device. A valve 58 is disposed between the vacuum source 40, the pressure source 42 and the vent 44 for selectively controlling fluid flow with the upper port 38.

Additionally, a lower port 46 may be disposed in fluid communication with the lower chamber 34 for selectively controlling pressure with and fluid flow to and from the lower chamber 34. The lower port 46 is ventable to ambient fluid conditions external to the pressure applicator device 10. In this regard, the lower port 46 may be disposed in fluid communication with a vent 52, as symbolically depicted in FIG. 3. As further symbolically depicted in FIG. 3, the lower port 46 is attachable to a vacuum source 48 for fluid evacuation of the lower chamber 34. In addition, the lower port 46 is attachable to a pressure source 50 for fluid increasing the fluid pressure within the lower chamber 34. It is contemplated that the vacuum source 48, the pressure source 50 and the vent 52 may comprise the same device. A valve 60 is disposed between the vacuum source 48, the pressure source 50 and the vent 52 for selectively controlling fluid flow with the lower port 46.

As mentioned above, a generally annular gasket 36 is disposed between the pressure bladder 30 and the suction member 16. The lower port 46 may be formed to extend radially inward towards the lower chamber 34 through the gasket 36. Preferably, the lower port 46 is integrally formed with the gasket 36.

In the preferred embodiment of the present invention, a heat source 54 may be adjacent the pressure bladder 30 for transferring heat to the repair patch 12 upon application of pressure to the repair patch 12 by the pressure bladder 30. Referring to FIG. 1, the heat source 54 is symbolically depicted-dashed lines and centered within the pressure bladder 30. The heat source 54 may take the form of a heat blanket. Further, the heat source 54 is preferably integrated with the pressure bladder 30. The heat source 54 is preferably an electronic device which would be controllably connected to a power source 56 as symbolically depicted in FIG. 3.

As mentioned above, it is contemplated that the fluid environment within the upper and lower chambers 32, 34 may be selectively controlled. In this regard, not only may pressure be controlled but also temperature as well. In this regard, another method of introducing heat into the system other than the heat source 54 as above discussed, the pressure sources 42, 50 may also function as heat sources. In this regard, for example, heated air may be introduced from the pressure source 42 into the lower chamber 34. It is contemplated that fluid pumped from the pressure sources 42, 50 need not necessarily take the form of air. In this respect, as used herein the term fluid may refer to any number of mediums capable of providing the desired presure and temperature characteristics are discussed herein and may be chosen from those which are well known to one of ordinary skill in the art. For example, sand, glass beads, water may be utilized.

In practice, it is contemplated that various curing processes can be facilitated by the pressure applicator device 10. For example, during a typical vacuum cure process of the repair patch 12, the upper chamber 32 may be vented to ambient pressure conditions via the vent 44. Concurrently, the lower chamber 34 may be exposed to a vacuum draw of the vacuum source 48. As a result, it is contemplated that the pressure bladder 30 would draw down upon the repair patch 12 exerting approximately atmospheric pressure thereto, as depicted in FIG. 2b. Further, it is contemplated that in applying a vacuum draw to the lower chamber 34 unwanted volatiles which may have developed therein during a curing process of the repair patch 12 would conveniently facilitate the removal of such volatiles. In addition, the upper chamber 32 may be further exposed to the pressure source 42 in order to facilitate an increase in pressure exerted upon the repair patch 12 by the pressure bladder 30.

The equivalent to a double vacuum bagging process may be effectuated by initially exposing the upper chamber 32 to a vacuum draw via the vacuum source 40. In this regard, it is contemplated that the pressure bladder 30 would flex upward and extend against the cover member 28, thereby collapsing the upper chamber 32. This is generally depicted in FIG. 2c. The now expanded lower chamber 34 may be exposed to a vacuum draw via the vacuum source 48. In this regard, volatile evolution may be encouraged as well as removal of such volitiles without the presence of atmospheric pressure or greater against the repair patch 12. It is contemplated that the application of such positive pressures at this stage in a curing process would mitigate volatile movement from the repair patch 12 into the inner chamber 34. Thus, the pressure applicator device 10 facilitates removal of potential voids in the repair patch 12 by encouraging such volatile evolution.

Accordingly, it is contemplated that the cooperative, selective and controlled application of vacuum, pressure and venting of both the upper and lower chambers 32, 34, along with the selective application of heat, advantageously facilitates multiple combination of processing capability.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. A pressure applicator device for applying pressure to a repair patch of a surface, the pressure applicator device comprising:
    an annular suction member for providing suction attachment to the surface about the repair patch;
    a cover member disposable above and across the suction member, the cover member being sealably attached to the suction member;
    a flexible pressure bladder formed of a generally fluid tight elastic material, disposed beneath the cover member and attached to the cover member and the annular suction member, the pressure bladder defining upper and lower chambers, the upper chamber being disposed between the cover member and the pressure bladder, the lower chamber being disposable between the pressure bladder and the surface, the pressure bladder being sized and configured to apply pressure to the repair patch upon fluid evacuation of the lower chamber.

2. The pressure applicator device of claim 1 wherein the upper chamber is formed to be ventable to ambient fluid conditions external to the pressure applicator device.

3. The pressure applicator device of claim 1 wherein the pressure bladder is sized and configured to extend towards the cover member upon fluid evacuation of the upper chamber.

4. The pressure applicator device of claim 3 wherein the upper chamber is formed to be ventable to ambient fluid conditions external to the pressure applicator device.

5. The pressure applicator device of claim 1 further comprises an upper port in fluid communication with the upper chamber for selectively controlling pressure within the upper chamber.

6. The pressure applicator device of claim 5 wherein the upper port is ventable to ambient fluid conditions external to the pressure applicator device.

7. The pressure applicator device of claim 5 wherein the upper port is attachable to a vacuum source for fluid evacuation of the upper chamber.

8. The pressure applicator device of claim 5 wherein the upper port is attachable to a pressure source for fluid increasing the fluid pressure within the upper chamber.

9. The pressure applicator device of claim 1 further comprises a lower port in fluid communication with the lower chamber for selectively controlling pressure within the lower chamber.

10. The pressure applicator device of claim 9 wherein the lower port is ventable to ambient fluid conditions external to the pressure applicator device.

11. The pressure applicator device of claim 9 wherein the lower port is attachable to a vacuum source for fluid evacuation of the lower chamber.

12. The pressure applicator device of claim 9 wherein the lower port is attachable to a pressure source for fluid increasing the fluid pressure within the lower chamber.

13. The pressure applicator device of claim 1 further comprises a gasket disposed between the pressure bladder and the suction member.

14. The pressure applicator device of claim 13 further comprises a lower port in fluid communication with the lower chamber for selectively controlling pressure within the lower chamber, the lower port extending radially inward towards the lower chamber through the gasket.

15. The pressure applicator device of claim 14 wherein the lower port is integrally formed with the gasket.

16. The pressure applicator device of claim 1 wherein the suction member comprises:
    an outer seal disposable around the repair patch; and
    an inner seal disposable radially interior to the outer seal and around the repair patch;
    wherein the outer seal and the inner seal being configured to form a vacuum seal within the region therebetween.

17. The pressure applicator device of claim 1 further comprising a heat source disposed adjacent the pressure bladder for transferring heat to the repair patch upon application of pressure to the repair patch by the pressure bladder.

18. The pressure applicator device of claim 17 wherein the heat source comprises a heat blanket.

19. The pressure applicator device of claim 17 wherein the heat source is integrated with the pressure bladder.

20. The pressure applicator device of claim 1 wherein the suction member is generally annular shaped.

* * * * *

UNITED STATES PATENT AND TRADEMARK OFFICE
CERTIFICATE OF CORRECTION

PATENT NO.   : 6,435,242 B1
DATED        : August 20, 2002
INVENTOR(S)  : Carl Andrew Reis and Thomas James Ambrose It is certified that error appears in the above-identified patent and that said Letters Patent is hereby corrected as shown below:

<u>Title page,</u>
Please insert -- [73] Assignee: Northrop Grumman Corporation, Los Angeles, California --

Signed and Sealed this

Eighteenth Day of March, 2003

JAMES E. ROGAN
*Director of the United States Patent and Trademark Office*